July 7, 1953 W. B. MOORE 2,644,426
ELECTRICALLY CONTROLLED FOLLOW-UP SYSTEM
Filed Feb. 26, 1948 4 Sheets-Sheet 1
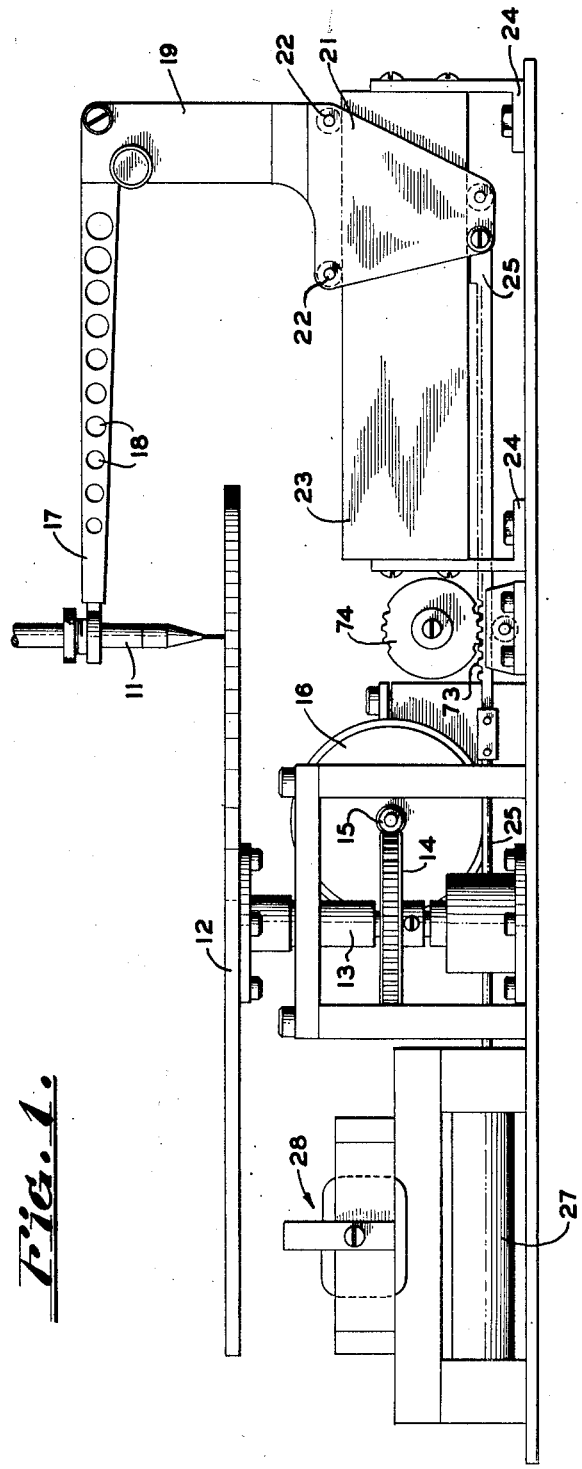
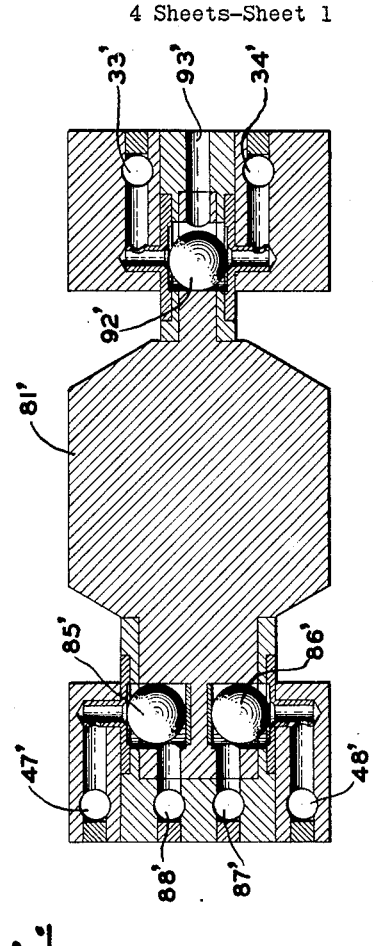
INVENTOR.
WAYNE B. MOORE
BY
ATTORNEY July 7, 1953 W. B. MOORE 2,644,426
ELECTRICALLY CONTROLLED FOLLOW-UP SYSTEM
Filed Feb. 26, 1948 4 Sheets-Sheet 2

INVENTOR.
WAYNE B. MOORE

BY N. J. Haufeld

ATTORNEY

July 7, 1953   W. B. MOORE   2,644,426
ELECTRICALLY CONTROLLED FOLLOW-UP SYSTEM
Filed Feb. 26, 1948   4 Sheets-Sheet 3
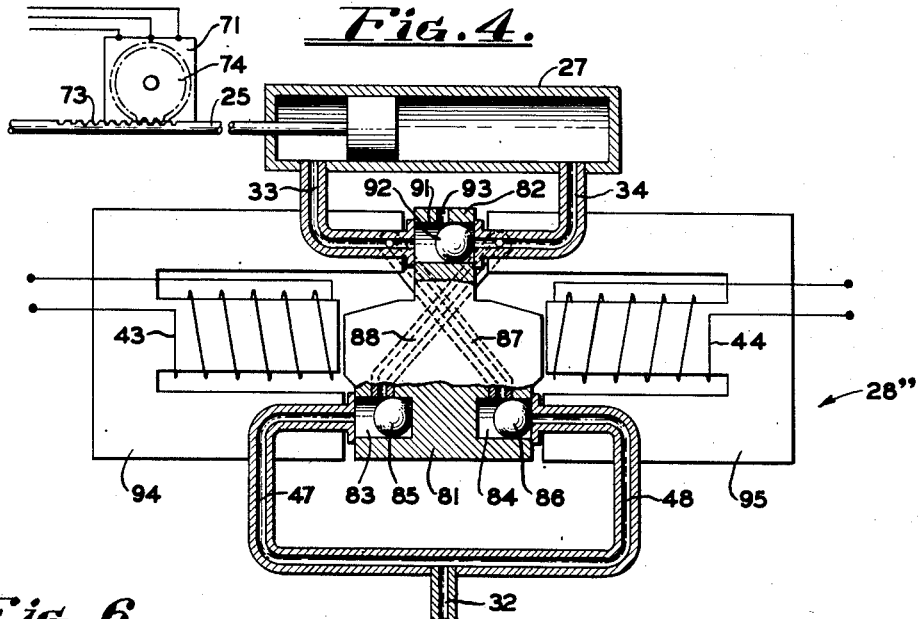
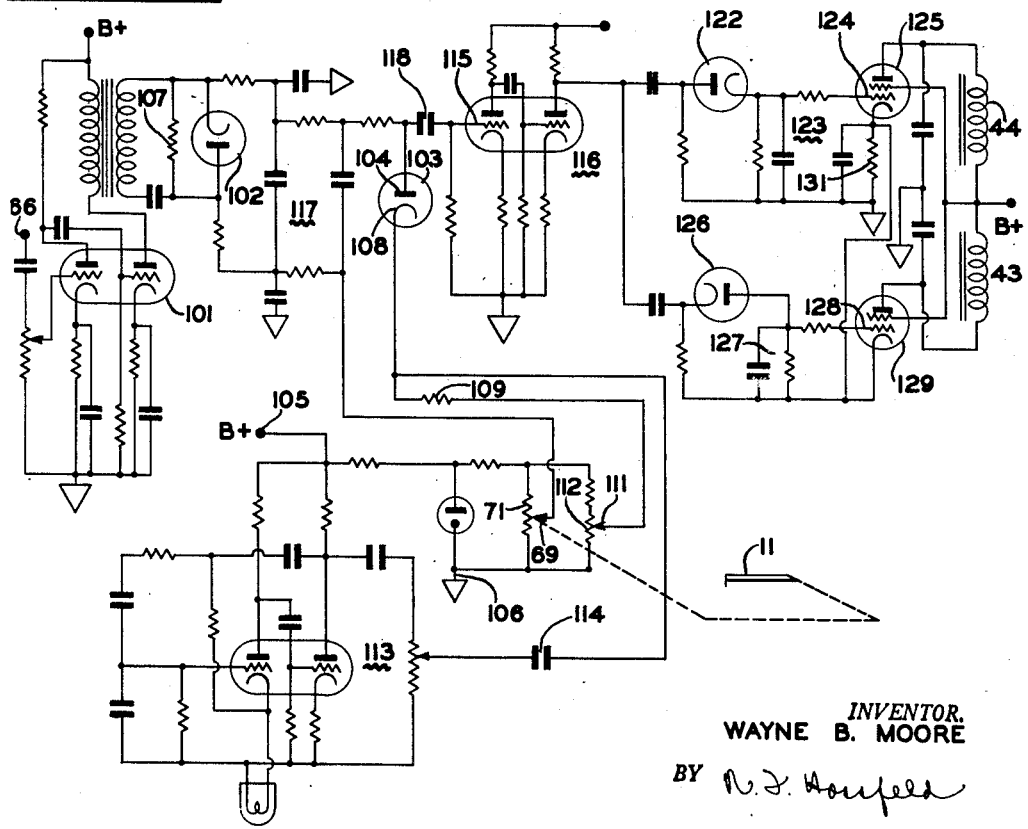
*INVENTOR.*
WAYNE B. MOORE
BY
ATTORNEY July 7, 1953  W. B. MOORE  2,644,426
ELECTRICALLY CONTROLLED FOLLOW-UP SYSTEM
Filed Feb. 26, 1948  4 Sheets-Sheet 4
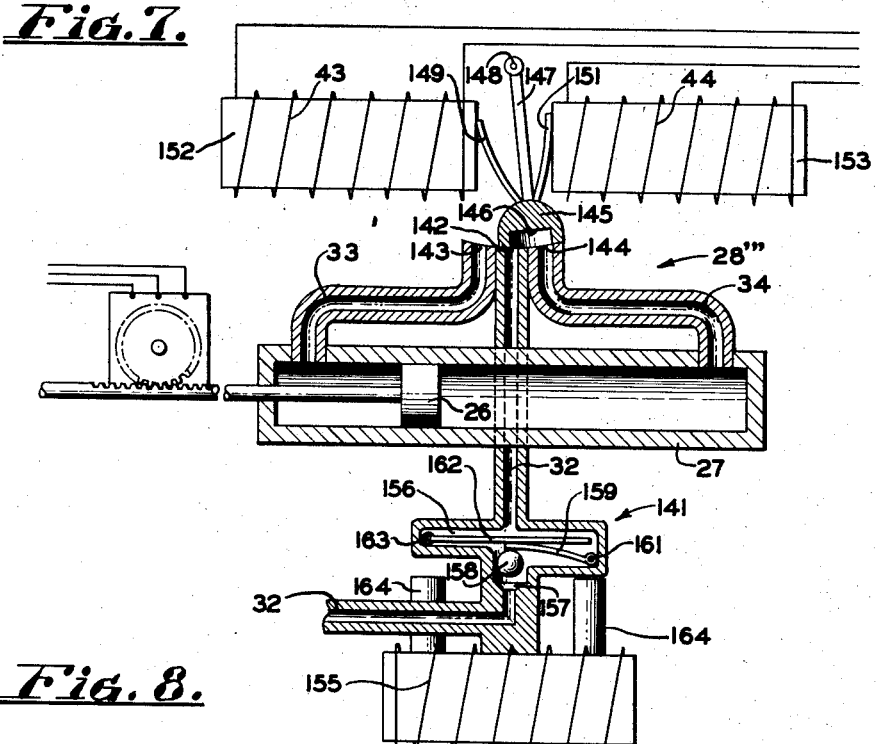
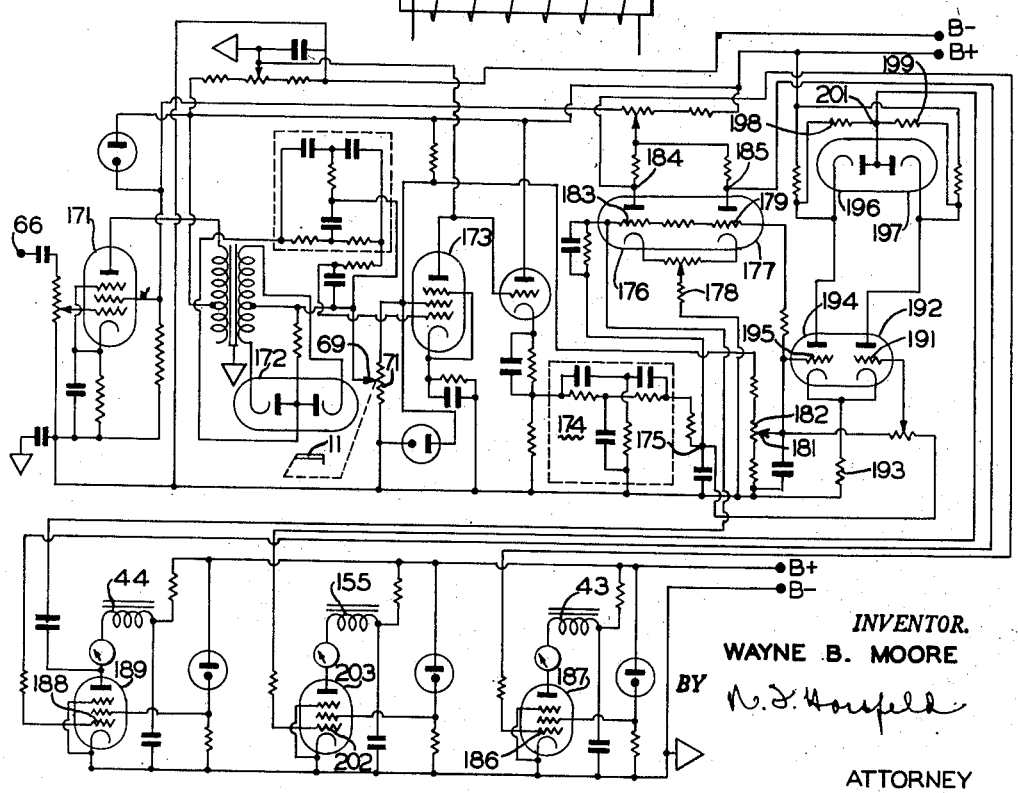
*INVENTOR.*
WAYNE B. MOORE
BY
*ATTORNEY*

UNITED STATES PATENT OFFICE 2,644,426

ELECTRICALLY CONTROLLED FOLLOW-UP SYSTEM

Wayne B. Moore, San Diego, Calif.

Application February 26, 1948, Serial No. 11,232

5 Claims. (Cl. 121—41)

(Granted under Title 35, U. S. Code (1952), sec. 266)

This invention relates to a follow-up system, and more particularly to a system by means of which a mechanical member such as a pen may be made to follow rapidly and accurately the variations in an electric signal. This invention has particularly advantageous application to the plotting on polar coordinate paper of the radiation pattern of a radio antenna.

It is an object of this invention to provide an improved system for moving a relatively heavy mechanical member accurately in accordance with the strength of an electric signal, with minimum time delay between the change in strength of the signal and the re-positioning of the member.

More particularly, it is an object of this invention to provide apparatus for accurately and substantially instantaneously positioning a graphing pen, movable over polar coordinate paper, in accordance with a characteristic such as magnitude of an electric signal, e. g. a signal radiated by an antenna.

It is another object of this invention to provide a follow-up system employing compressed air to instantly and uniquely position a mechanical member in accordance with an electric signal.

It is a further object of this invention to provide improved valve means for directing a fluid selectively into either end of a cylinder which contains a driving piston, and to simultaneously exhaust, or vent to atmosphere, the other end of the cylinder.

Specifically, it is an object of this invention to provide such a valve as may be actuated in response to a characteristic of an electric signal.

It is a further object of this invention to provide electric circuit means for energizing a pair of flux generating coils, which in turn actuate a valve to direct fluid selectively into either end of a piston-driving cylinder, the energization of the respective coils being determined by the magnitude of an input electric signal.

It is an additional object of this invention to provide a valve actuatable selectively between two positions in response to the energization of a pair of flux generating coils, which valve will meter the flow of fluid through the valve in proportion to the arithmetic difference in energization of the coils.

In accordance with these and other objects which will become manifest in the following description, the follow-up system constituting the instant invention comprises a mechanical member connected to be positioned by a piston reciprocable within a cylinder. Specifically, the mechanical member consists of an inking pen mounted on the end of an arm which extends radially over a turn-table bearing a piece of polar graphing paper. The outer end of the arm is suitably mounted for reciprocation radially of the turn-table, and is connected by suitable push rods to the piston.

The cylinder is provided with fluid conduits communicating with its respective ends, the other end of each conduit communicating with a valve which is operable to supply fluid under pressure to either end of the cylinder, while simultaneously venting fluid from the opposite end. The valve may also assume a position wherein fluid flows to neither end of the cylinder, whereby the pen remains stationary.

The valve comprises essentially a valve body having an inlet conduit, by which fluid under pressure may be supplied to the valve and a pair of outlet conduits, by which the incoming fluid may be directed selectively to either end of the cylinder. Ferromagnetic valve means are mounted for movement back and forth between two positions to apply fluid selectively to either outlet conduit. This valve means is controlled in accordance with the energization of a pair of flux generating or inducing coils. These coils are energized from an electric circuit capable of causing an electric signal to control the balance of energization between two coils, so that the valve will be actuated in such a manner as to position the piston at a unique point, depending on the electric signal.

To effectuate such follow-up control, the electric circuit includes a compensating impedance which is positioned in a portion of the circuit that is energizable in response to the incoming electric signal, and which is variable mechanically in accordance with the position of the piston, to which it is connected by suitable mechanical linkage. This compensating impedance most conveniently assumes the form of a potentiometer, positioned in a portion of the circuit that is energized in response to the electric signal, and having its movable arm or slider connected to be positioned uniquely in response to the position of the inking pen, and hence of the piston.

The preferred actuating fluid is compressed air, and the description hereinafter will illustrate the instant invention using that medium, although it is to be understood that many fluids are now known which are suitable for this purpose.

Several modifications of the instant invention are illustrated in the drawing, wherein:

Fig. 1 is an elevational view showing the marking pen and rotatable disk assembly forming a portion of the instant follow-up system;

Fig. 4 is a view similar to that of Fig. 2, showing somewhat schematically an alternative type of valve which may be used to drive the pen illustrated in Fig. 1;

Fig. 5 is an actual cross-section of a valve which functions like the valve shown schematically in Fig. 4;

Fig. 6 shows a circuit for energizing the valve of Figs. 4 and 5. The circuit of Fig. 6 may also be used to energize the type of valve shown in Fig. 2, just as the Fig. 3 circuit may be used to energize a valve of the Fig. 4–5 type;

Fig. 7 shows still another alternative form of valve, which may be susbtituted for those of Figs. 2, 4, or 5, to control the pen-driving mechanism of Fig. 1;

Fig. 8 illustrates a circuit suitable for energizing the control magnets of the valve shown in Fig. 7.

Figure 2:
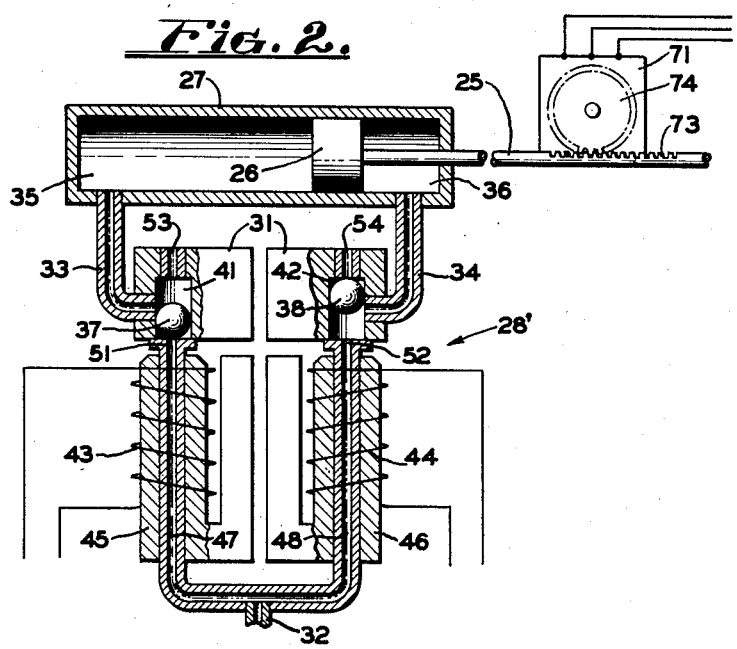
Fig. 2 illustrates partly schematically one form of valve for selectively driving the pen-connected piston back and forth.

Referring to Fig. 1, 11 designates a vertically mounted marking pen, the point of which rides on the face of a turn-table 12 rotated on the vertical shaft 13, which is driven through gears 14 and 15 by a suitable follow-up or servomotor 16. In use, the motor 16 is generally driven at constant speed, although this is not in the least essential to operation of the device.

Pen 11 is secured at the end of an arm 17, perforated at 18 for lightness, the other end of which is secured to a standard 19 for radial movement with respect to this disk 12. Standard 19 is mounted on a bracket 21, near the top of which are pivoted a pair of wheels 22, which ride on a high rail 23 mounted by brackets 24 radially with respect to the disk 12. To the bottom edge of bracket 21 is secured a push rod 25 extending diametrically underneath the turn-table 12 and terminating in a piston 26 (Fig. 2), reciprocable within a cylinder 27. By proper application of driving air to the respective ends of cylinder 27, the push rod 25 may be reciprocated.

From the description thus far, it will be manifest that the radial position of the point of pen 11 above the turn-table 12 is determined directly by the position of the piston 26 in the cylinder 27. Admission of driving air to the cylinder 27 for determining the position of the piston 26 is controlled by a valve 28, mounted for convenience atop the cylinder 27 and beneath the turn-table 12. Several suitable forms for the valve 28 are illustrated in the succeeding figures; the first to be discussed is that shown in Fig. 2, wherein 28' designates generally one form of valve for use as the valve 28 in Fig. 1.

The valve 28' comprises a body 31 to which air may be admitted through an inlet conduit 32. A pair of outlet conduits 33 and 34 lead from the valve 28' to the respective ends 35 and 36 of the cylinder 27. Ferromagnetic valve means are provided for selectively diverting incoming air from the inlet conduit 32 to either of the conduits 33 or 34. In the Fig. 2 embodiment this means takes the form of a pair of spheres 37 and 38 reciprocable in a pair of somewhat elongate chambers 41 and 42 formed in the body 31.

Movement of the spheres or balls 37 and 38 is effected by a pair of coils 43 and 44 wound around respective U-shaped core pieces 45 and 46, positioned adjacent the chambers 41 and 42 so as to create magnetic flux fields generally longitudinally of the chambers. The inlet conduit 32 is bifurcated into two branches 47 and 48, which pass conveniently through the pole pieces 45 and 46, and terminate at one end of the respective chambers 41 and 42 in inlet ports 51 and 52, respectively. Exhaust ports 53 and 54, which vent to atmosphere, are provided respectively in the other ends of chambers 41 and 42. It will be noted that the coils 43 and 44 are so disposed that when either generates flux the respective balls 37 and 38 are pulled against the respective inlet ports 51 and 52 to block admission of air from inlet conduit 32.

When air pressure is applied through conduit 32, and the coils 43 and 44 are not energized, the balls 37 and 38 are driven upward and held against the exhaust ports so that no air can flow. If the coils are equally energized the balls are attracted downwardly with equal force, thereby maintaining the balance in the system so that piston 26 does not move and air flow is still blocked. Should the energization of the coils be unbalanced, however, the two balls do not assume balanced positions and air is admitted to one side of the cylinder 27, while being simultaneously exhausted from the other. For example, assume that the magnetic pull on ball 37 is greater than that on ball 38. The fact that air pressure on each ball is the same results in ball 37 assuming a position lower than that of ball 38. Air therefore flows from inlet 52 into chamber 42, outlet conduit 34, and cylinder 27, where it impels piston 26 to the left. Simultaneously air is vented from the left hand end of cylinder 27, through conduit 33, chamber 41 and vent port 53. Converse operation occurs when the pull on ball 37 is less than on ball 38.

Figure 3:
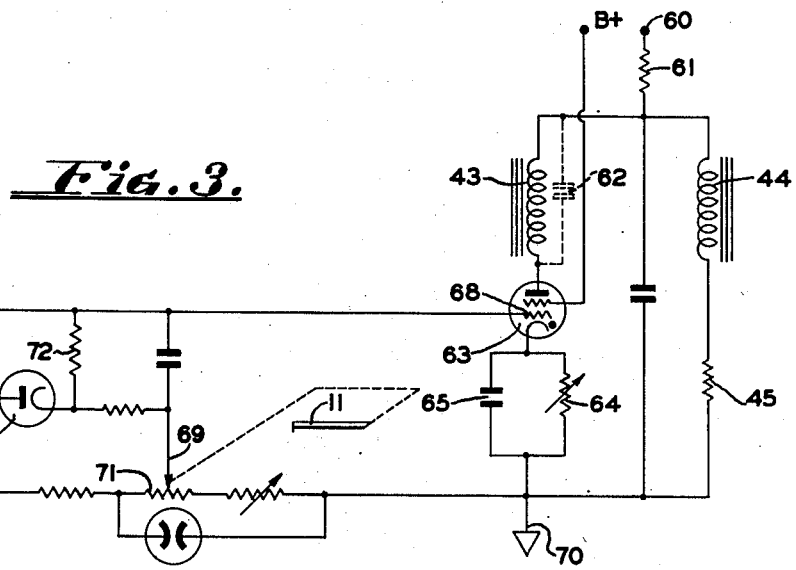
Fig. 3 is a wiring diagram of a circuit suitable for energizing the actuating coils of the valve of Fig. 2.

If now means are provided for energizing coils 43 and 44 conversely, or differentially, so that current in one is made to increase as current in the other is made to decrease, a control may be established which will open one side of the valve simultaneously with closing of the other side, or when currents are equal, will close both sides of the valve, thereby to control movement of piston 26 in accordance with energization of the coils 43 and 44. Such a means is shown in the circuit of Fig. 3, wherein 60 represents a terminal connected to the positive side of a high voltage supply. Current from this supply flows through a relatively high resistance 61 and thence in parallel through two branches, the first of which consists of the valve coil 44 in series with a resistor 45. The other branch includes the coil 43, the plate cathode connections of a gas filled tube 63, and a time constant circuit in the form of a parallel RC circuit 64—65.

For purposes of example, it will be assumed that the pen 11 is to be positioned in accordance with the field strength of a rotatable antenna. A carrier wave modulated by a constant frequency audio signal is radiated by the antenna, which is rotated at some distance from a receiver. The follow-up or servomotor 16 is driven in accordance with the azimuth position of the antenna, which in turn therefore controls the angular position of the turn-table 12.

The received signal is demodulated, and the derived audio signal, the strength of which is proportional to that of the carrier, is applied to the input terminals 66 in Fig. 3. This signal is half wave rectified in a rectifier 67, and applied between the grid 68 of the tube 63, and the slider 69 of a potentiometer 71, connected between ground 70 and B plus. Rectification of the signal takes place in the rectifier 67 and the resistor 72 only on the negative swing, so that the potential on grid 68 is essentially the positive bias at the slider 69 less the unidirectional voltage produced by the half wave rectification of the signal applied to the terminals 66.

In order that the follow-up system may function properly, it is essential that movement of the piston 26 operate in some fashion to restore the balance between the currents in coils 43 and 44. In the instant invention this is done by moving the slider 69 along the potentiometer 71 in accordance with the position of the piston 26. As shown in Figs. 1 and 2, rack teeth 73 are formed on the rod 25, and engage a pinion 74 which is connected to the slider 69 of the potentiometer 71.

Tube 63 is gas filled and will continuously conduct after ionization until the plate voltage drops to a low value. In order for grid 68 to maintain constant control over the passage of current thrugh tube 63, the plate voltage must periodically drop to a value which will cause the tube to cease conducting. Since direct current is preferred for the proper operation of the solenoid which includes winding 44, a direct current plate supply is employed. It has been found that the negative resistance characteristics of a gas tube may be utilized in an arrangement which includes resistor 64 and capacitor 65 connected in parallel in the cathode circuit and winding 43 with its distributed capacitance 62 in the plate circuit to build up oscillations which are of sufficient magnitude to cause the tube to cease conducting when the control grid becomes negative. The time constant of the cathode circuit is long with respect to that of the plate circuit so that grid control of the plate circuit of tube 63 is maintained over a range of plate current between zero and maximum. It will be understood that there are numerous other suitable known methods for providing a pulsating direct current plate supply which will enable the grid in a gas tube to maintain control of current flow through the tube.

An increase in signal voltage on terminal 66 increases the voltage across the resistor 72, which, being opposed to the bias at slider 69, and negative with respect to grid 68, lowers the net grid-to-cathode voltage on the tube 63. This decreases the average current through the coil 43. The value of resistor 61 is sufficiently high to cause a substantially constant total current to flow from the "B" supply terminal 60, so that a reciprocal increase in current takes place in the coil 44. The consequent unbalance in currents in the two coils results in the ball 38 being pulled downward to close the port 52, while the ball 37 is pushed upward by air pressure as a result of the decreased pull on that ball. The resulting air flow causes the piston 26 to move to the right in Fig. 2, thereby moving the pen 11 outwardly of the turntable 12.

The rightward motion of rod 25 moves the slider 69 to the left in Fig. 3 through the rack 73 and pinion 74. This movement continues until the piston 26 has moved the slider 69 far enough to the left in Fig. 3 to raise the potential on grid 68 back to the equilibrium value, where the current in coil 43 equals that in coil 44. The position of piston 26 and hence of pen 11 is thus determined by the magnitude of the signal applied to the terminals 66.

*Operation*

The complete operation of the apparatus shown in Figs. 1, 2, and 3 will now be reviewed. A signal of given amplitude applied to terminals 66 (Fig. 3) is just correct to pass an average current through tube 63, equal to that flowing through coil 44. The magnetic pulls on the balls 37 and 38 are thus equal, and since the air pressure at 51 is the same as at 52, the balls 37 and 38 assume identical positions within the chambers 41 and 42, respectively. The equalized pressure on each side of the piston 26 holds the pen 11 at a given radius on the rotating turn-table 12, corresponding to the amplitude of the signal at 66.

The potential on grid 68 (Fig. 3) is equal to the algebraic sum of a positive component embodied in the voltage drop between slider 69 and ground 70, and a negative component embodied in the half wave rectified current flowing through resistor 72. Assume that the signal on terminals 66 decreases. This decreases the negative component of the potential on grid 68, thereby increasing the average current through tube 63 and the coil 43, and decreasing the current through coil 44. The result is an unbalance between the balls 37 and 38; the former being pulled down to shut off conduit 33 from inlet port 51 and connect it to exhaust port 53; and the latter being pushed up by air flow to cut off exhaust port 54 and admit air to the right hand side of piston 26. The resulting leftward movement of piston 26 (Figs. 1 and 2) moves pen 11 to the left, indicating, as it should, a decrease in signal strength. Through rack 73 and pinion 74, the slider 69 is moved to the right (Fig. 3), thereby decreasing the positive component of the potential on grid 68, until the average current through tube 63 becomes equal to that through the coil 44. At this point the magnetic pull on the respective balls 37 and 38 is equalized, and the valve 28 again becomes balanced, with the balls 37 and 38 occupying identical positions in their chambers 41 and 42, respectively. The piston 26 has moved leftward to a position corresponding to the new, smaller signal value, where it remains until another variation in signal strength takes place.

*First modification*

A first modified form of valve and circuit which may be substituted interchangeably for the above described valve and circuit is shown in Figs. 4, 5, and 6. Referring to Fig. 4, the valve 28'' is shown having a valve body 81 of reduced upper portion 82. In opposite faces of the main portion of the body 81 are formed chambers 83 and 84, in which reciprocate ferromagnetic balls 85 and 86, respectively. As in the case of the Fig. 2 valve, the inlet conduit 32 is bifurcated into two branches, 47 and 48, communicating respectively with the ends of the chambers 83 and 84. By means of a connecting conduit 87, the chamber 84 is connected at one side thereof to outlet, or cylinder connecting, conduit 33. Chamber 83 is similarly connected to outlet conduit 34 by means of a connecting conduit 88, which crosses the conduit 87. In the reduced body portion 82 is formed a through bore constituting an exhaust chamber 91 in which a ball 92 reciprocates. The ends of the chamber 91 communicate respectively with conduits 33 and 34, while at the side of the chamber 91 there is provided an exhaust port 93.

On opposite sides of the valve body 81 are mounted W-shaped pole pieces 94 and 95, the middle legs of which mount the coils 43 and 44, respectively. The outer legs of the pole pieces 94 and 95 terminate adjacent the chamber 91 and the chambers 83 and 84, respectively, so that current through one of the coils, 43 for example, pulls the ball 85 to the left in chamber 83, shutting off the inlet branch 47, and also pulls the ball 92 to the left in chamber 91 to close that chamber from the conduit 33 and simultaneously connect the conduit 34 with the outlet port 93 through the chamber 91. Under this condition, air from inlet conduit 32 flows into branch 48, chamber 84, connecting conduit 87, outlet conduit 33 and thence into the left side of cylinder 27, where it pushes piston 26 rightward. The exhausting air in front of piston 26 flows through conduit 34 and out exhaust port 93.

Converse operation occurs when the energization of coil 44 exceeds that of coil 43, just as in the case of the valve of Fig. 2. Likewise, in manner similar to that of Fig. 2, an intermediate, balanced position is assumed by the balls 85, 86, and 92 whenever the currents in coils 43 and 44 are equalized.

The actual valve body 81 of Fig. 4 preferably assumes the configuration shown in Fig. 5, wherein the primed numerals correspond to the same numerals unprimed in Fig. 4. The relation between these two types of valve bodies (Figs. 4 and 5) is so close that further description will be omitted. The actual reciprocating travel of the balls 85', 86', and 92' is very short, in the order of a few thousandths of an inch.

A suitable circuit for actuating the valve of Figs. 4–5 is shown in Fig. 6, wherein the controlling signal is applied to the input terminal 66 amplified twice in the dual tube 101 and rectified in rectifier 102. The rectified signal from 102 is applied between the plate of a spill-over diode 103 and the slider 69 of the potentiometer 71. As in the case of the Fig. 3 circuit the potential at the diode plate 104 has two components. There is a positive component resulting from the voltage drop created by the B+supply 105 between the slider 69 and ground 106. There is another component, in this case also positive, resulting from the half wave rectified current flowing through the resistor 107. The cathode 108 of diode 103 is backed off to a predetermined positive voltage, by being returned through a resistor 109 to the slider 111 of another potentiometer 112 also connected between B plus 105 and ground 106. Thus, a degree of conduction is maintained in the diode 103 which is variable in accordance with the magnitude of the rectified voltage appearing across resistor 107.

A constant frequency audio oscillator 113 has its output connected through a capacitor 114 to the cathode 108 of the diode 103. The amplitude of the audio signal which is enabled to pass through the diode 103 to affect the grid 115 of an amplifier 116 is thus determined directly by the backing off current through the diode 103 resulting from the two biases at 69 and 107, respectively. The latter, rectified and smoothed out by a filter 117, is substantially a D. C.

That portion of the oscillator signal which passes through rectifier 103 is amplified in amplifier 116, and is divided and fed into two half wave rectifiers 122 and 126, respectively. The rectifier 122 passes positive half cycles which are filtered at 123 and fed to the grid 124 of a tube 125, in the plate circuit of which is connected the coil 44. The negative half cycles pass through the rectifier 126, are filtered at 127, and are applied as a negative bias to the grid 128 of a tube 129 in the plate circuit of which is connected the coil 43. The grid 124 of tube 125 is given an additional, negative bias by virtue of the current in cathode resistor 131, so that for a predetermined amount of audio signal spillover through rectifier 103, the net grid voltages on 124 and 128, respectively, are equal, thereby causing equal currents in the coils 43 and 44.

*Operation of first modification*

The operation of the valve of Fig. 4 as controlled by the circuit of Fig. 6 will now be described, it being understood that either of these portions of the system may be substituted individually for the corresponding portions shown in Figs. 2 and 3 respectively.

With a given signal on the input terminal 66, currents in coils 44 and 43 are equal, thereby maintaining balls 86 and 85 in balanced, identical positions, so that air pressure is equalized on the piston 26. Assume the signal on terminal 66 increases. This increases the rectified component (across resistor 107) of the voltage on the plate 104 of the diode 103. Increased conductivity of the diode 103 allows more of the signal of oscillator 113 to be applied to the grid 115. This increases the output of the amplifier 116, the positive half cycles of which pass through rectifier 122 to increase the grid-cathode bias on grid 124. Simultaneously the negative half cycles of the output from 116 pass through rectifier 126, to decrease the grid-cathode bias on the grid 128. This causes an increase in current through coil 44 and a decrease through coil 43. The resulting unbalance in the energizing currents in valve 28'' causes balls 85, 86, and 92 to move rightward from their positions of equilibrium; and allows air to flow from inlet conduit 32 thru conduits 47, 88, and 34 into the right hand side of cylinder 27 pushing piston 26 outward and causing pen 11 (Fig. 1) to move to the right.

Through rack 73 and gear 74, slider 69 (Fig. 6) of potentiometer 71 is caused to move downward, thereby decreasing the potentiometer component of the voltage applied to the plate 104 of the diode 103. Motion of the slider 69 ceases when the net voltage (D. C.) on the plate 104 is just sufficient to allow the predetermined, correct amount of oscillator signal to spill through diode 103 to maintain equilibrium of currents in coils 43 and 44. This equilibrium restores the balls in valve 28'' to a balanced position, wherein air is neither admitted to, nor vented from, cylinder 27.

*Second modification*

A second modified form of valve and circuit, which may also be substituted for the valves and circuits above described, is shown in Figs. 7 and 8. The valve 28''' in Fig. 7 has an inlet conduit 32 and outlet conduits 33 and 34, just as in the case of the previously described valves. The inlet conduit, however, is not bifurcated as before, but is led directly upward through a metering valve 141, to be described hereinafter, and terminates in a port 142. The conduits 33 and 34 likewise terminate in ports 143 and 144 positioned on opposite sides of the port 142. The terminating face of the three ports is concavely arcuate, so that a valve member 145 may rock back and forth across the faces of the ports, to selectively apply incoming air from port 142, either to port 143 or to port 144, while simultaneously venting the unselected port to atmosphere. This it does by virtue of a nether recess 146 which forms a juncture conduit between the ports.

Member 145 is secured to the end of a ferromagnetic arm 147, pendantly pivoted at 148 and provided with oppositely disposed flexure arms 149 and 151 which bear against the pole pieces 152 and 153, respectively, around which the coils 43 and 44 are wound. The flexure members 149 and 151 are of equal strength, so that with balanced currents in coils 43 and 44, they tend to maintain the arm 147 in mid-position. When, however, the coil currents become unbalanced, the arm 147 is pulled to one side or the other, depending on the algebraic difference in coil currents, thereby causing the piston 26 to move in the appropriate direction.

The valve 28''' in Fig. 7 includes a metering valve 141 not found in the previously described embodiments. The valve 141 is actuated by a coil 155, which is energized in inverse proportion to the arithmetic difference between the currents in coils 43 and 44. Thus, when a large current unbalance occurs, irrespective of the direction of the unbalance, the valve 141 is opened wide to admit a large flow of air through the conduit of 32, which drives the piston 26 rapidly. As the degree of unbalance decreases, the current in coil 155 increases, thereby gradually closing the valve 141 and throttling the flow of air through the inlet conduit 32.

The valve 141 embodies certain features which make it uniquely applicable for use as a metering valve. These features are such that the closing force on that valve is made non-linear in relation to the flux produced by coil 155, so that when the valve is wide open, a small increase in flux produces a marked throttling by the valve, but when the valve is nearly closed, a very much larger flux is needed to further increase the throttling effect.

These features of the valve 141 will become readily manifest in the following description, wherein 156 designates a valve chamber having an inlet port 157 fed by the conduit 32. The outlet port connects with the continued extension of the inlet conduit 32. A ball 158 rests against the port 157 and is impelled away from the port by the incoming air pressure. A lever 159 pivoted at 161 rides against the top of the ball 158, and is in turn pressed downward by a ferromagnetic lever or armature 162 pivoted at 163, which is actuated by the pole pieces 164, magnetically energized from the coil 155. It will be noted that one of the levers, in the illustrated case, lever 159, is curved convexly with respect to the other, so that the fulcrum point of the lever 162 against the lever 159 shifts continuously toward the pivot 161, and away from the pivot 163, as the lever 162 is pulled downwardly against the lever 159. It will be manifest that when the magnetic pull is small, the fulcrum point between the two levers is substantially directly over the ball 158 at the left hand end of lever 159. However, as the lever pivots downward, the fulcrum point shifts steadily to the right, thereby decreasing the mechanical advantage of the lever 162 against the lever 159. This is due to the double effect of the fulcrum point moving simultaneously away from the pivot 163 and toward the pivot 161. Either one of these effects would produce a similar non-linear resistance, but by cumulating them the effect may be made more sharply effective.

A suitable circuit for actuating the coils 43, 44 and 155 of Fig. 7 is shown in Fig. 8, wherein an incoming signal applied to terminal 66 is amplified at 171, rectified at 172, and applied as a D. C. in series with the compensating slider 69. The potentiometer 71 on which the slider 69 rides is connected between B plus and ground to form the positive component of bias while the signal voltage rectified in 172 forms the negative component, just as in Fig. 3. This bias is applied to the grid of an amplifier 173, the output of which is filtered at 174 and appears at point 175 as a uni-directional, of D. C. potential, varying substantially proportionally with the magnitude of the A. C. signal at 66.

A pair of tubes 176 and 177 are connected through a common cathode resistor 178. The grid 179 of the tube 177 is maintained at a substantially constant potential with respect to ground by being returned to slider 181 of a potentiometer 182. The grid 183 of the tube 176 is energized in accordance with the varying D. C. voltage at point 175. For a predetermined voltage at 175, the plate potentials of 176 and 177 will be equal. A rise in the voltage at 175 causes a corresponding drop in plate potential at 184; and by virtue of the increased current in resistor 178, produces an increase in bias on the cathode of tube 177 which decreases the current therethrough and raises the potential at the plate 185. The tubes 176 and 177 are thus connected in what might be called a seesaw circuit, wherein one voltage drops as the other rises, and vice versa; and wherein the voltages are equal only for a predetermined positive value of voltage at point 175.

The plate potential at 184 is applied to the grid 186 of a tube 187 in the plate circuit of which is connected the coil 43. The plate potential at 185 is applied to the grid 188 of a tube 189, in the plate circuit of which is connected the coil 44.

The balancing operation of the Fig. 8 circuit is substantially the same as that of the circuits hereinbefore described. For example, an increase in signal strength at terminal 66 produces an increased output from the rectifier 172 which appears as more negative bias on the tube 173. This raises the potential at the plate of tube 173. The resulting increase in potential at point 175 drops the voltage at 184 and, by virtue of the common cathode resistor 178, raises the voltage at 185. This causes a decreased current through the tube 187 and the coil 43, and an increased current through the tube 189 and the coil 44. Valve member 145 is pulled to the right, causing the piston 26 to move outwardly of the cylinder 27, thereby moving the pen 11 to the right, in Fig. 1.

The coil 155 is energized in the following manner. The point 175 is connected to the grid 191 of a tube 192, which has a common cathode resistor 193, with a tube 194, the grid 195 of which is held at a substantially constant potential with respect to ground by being returned to slider 181. A pair of oppositely poled series connected rectifiers 196 and 197 are bridged between the respective plates of the tubes 192 and 194; and shunting these rectifiers are series-connected resistors 198 and 199, the juncture point 201 between the rectifiers 196 and 197 being connected to that between resistors 198 and 199. With equal voltages on the plates of tubes 192 and 194, there will be no current in the resistors 198 and 199. Should the plates become unbalanced, a current flow will take place between them which will cause the point 201 to drop in potential, regardless of the polarity of the unbalance. This is because of the action of the rectifiers 196 and 197 which in effect shorts out one or the other of the resistors 198 or 199, depending on the polarity of the unbalance. For example, assume that the plate potential of tube 194 rises while that of 192 falls correspondingly. Current thus flows through resistor 198, but is by-passed around resistor 199, by the rectifier 197. Point 201 thus drops in potential, in accordance with the arithmetic difference between the plate potentials of tubes 192 and 194. An unbalance in the other direction would also cause a drop in potential at point 201, by reason of the shunting action of rectifier 196 around resistor 199.

Point 201 is connected to the grid 202 of a tube 203, in the plate circuit of which is the coil 155 of the valve 141. Thus, the arithmetic unbalance in the system produced by a change in the incoming signal at terminal 66 appears as a proportional decrease in current in the coil 155, which allows the air pressure to lift the ball 158 and permit a greater flow of air through the valve 28'''.

*Operation of second modification*

The operation of the valve of Fig. 7, as energized by the circuit of Fig. 8, will now be described. For a given net bias on the tube 173, and hence for a given voltage at point 175, current balance exists in tubes 176 and 177 and in tubes 192 and 194. The resulting balance in currents in coils 43 and 44 holds arm 147 at mid-position, wherein incoming air is blocked, being directed neither to conduit 33 nor to conduit 34. By virtue of the balanced condition, the voltage at point 201 is maximum positive being equal to voltage at the plates 192 and 194. The current in tube 203 is thus a maximum, so that coil 155 is given maximum energization and maximum pull is applied to the armature lever 162. Ball 158 is thus held at its lowest or most throttling position.

Assume that the signal at 66 decreases. This lessens the negative, or rectified, component of the bias applied to the grid of tube 173. A corresponding increase in current flow occurs, which drops the plate potential of 173 causing a drop in potential at the point 175. The drop at point 175 appears as an increased voltage at 184, and a decreased voltage at 185, which causes increased current in the tube 187 and decreased current in the tube 189. The resulting unbalance in magnetizing flux on the arm 147 pulls the valve member 145 to the left, allowing air to enter the conduit 33 and exhaust from the conduit 34. This moves piston 26 inward (to the right in Fig. 7) and causes pen 11 to move in toward the center of the turn-table 12 (Fig. 1). The resulting motion of slider 69 (downward in Fig. 8) decreases the positive component of the bias on the grid of tube 173. Movement of the piston 26 continues until the grid of 173 has been returned to its stable value, whereupon valve member 145 resumes its mid-position and the piston 26 stops.

Simultaneously with the above rebalancing of the system, the valve 141 has been operated in the following manner. Decrease of the voltage at 175 raises the voltage on the plate of tube 192 and drops the voltage on the plate of tube 194. The resulting current flow through resistor 199 and rectifier 196 lowers the voltage at point 201, which is translated into a current decrease in the tube 203 and the coil 155. The decreased pull on the armature lever 162 allows the incoming air to push the ball 158 farther away from the seat 157, thereby diminishing the throttling action of the valve 141. As balance is restored, the potential at point 175 returns steadily to its stable value, causing a steady increase in the pull exerted by coil 155 on armature lever 162, so that by the time full equilibrium is established, the ball 158 has been pulled down almost fully against the seat 157. The action of valve 141 thus tends to prevent overswinging of the piston 26, and consequent hunting within the system.

Several embodiments of this invention have been described herein; it will be understood that additional modifications may be made in this invention without departing from the spirit and scope thereof as set forth in the appended claims.

The invention herein described may be manufactured and used by or for the Government of the United States of America for governmental purposes without the payment of any royalties thereon or therefor.

What is claimed is:

1. Follow-up mechanism for positioning a mechanical member in accordance with an audio frequency modulated radio frequency signal, comprising a track, a bracket having wheels riding on said track, a reciprocable rack secured to said bracket, a pinion meshing with said rack, a piston attached to said rack to reciprocate the same on said track, a cylinder encompassing said piston, conduits for admitting driving fluid to said cylinder to control the position of said piston, valve means in said conduits for controlling the admission of fluid to said cylinder, and electric means connected to control the operation of said valve means in accordance with the signal to be followed, said electric means including amplifying means effective to amplify said signal, means to demodulate said amplified signal, a potentiometer having two winding terminals and one slider terminal, means to connect said demodulated amplified signal to a first winding terminal of said potentiometer, means to connect a counter voltage to a second winding terminal of said potentiometer, at least one balancing circuit having an input terminal and a pair of output terminals effective to deliver two output voltages having varying amplitudes relative to each other depending on the extent and direction of the deviation of the voltage applied to said input terminal from a predetermined balance voltage which is effective to produce equal voltages at said pair of output terminals, means for connecting the slider terminal of said potentiometer to said balancing circuit input terminals, means to amplify the outputs of said balancing circuits, solenoids for actuating said valve means in response to the amplified outputs of said balancing circuits, said potentiometer having its slider adapted to be positioned by said pinion whereby follow-up control over said mechanical member is exerted to compensate for changes in the strength of said signal.

2. A follow-up system for positioning a mechanical member in accordance with an electric signal comprising a member to be positioned, a pair of electric solenoids constructed and arranged to control movement of said member in either of two directions depending upon the algebraic difference in energization applied to said solenoids, respectively, a third electric solenoid constructed and arranged to be energized to control the speed of movement of said member in both directions, a first balancing circuit having an input terminal and a pair of output terminals, effective to deliver to said output terminals equal voltages for a given input voltage, one of said output terminal voltages dropping and the other rising when the input voltage rises above said given voltage, and vice versa, a first amplifier connected to the input terminal of said first balancing circuit effective to deliver thereto a voltage varying in response to an electric signal, a second amplifier adapted to receive the output from one terminal of said first balancing circuit and deliver an energization current to one of said pair of solenoids, a third amplifier adapted to receive the output from the other terminal of said first balancing circuit and deliver an energization current to the second of said pair of solenoids, a second balancing circuit having an input terminal and a pair of output terminals, effective to deliver to said output terminals equal voltages for a given input voltage, one of said output terminal voltages dropping and the other rising when the input voltage rises above said given voltage, and vice versa, means to connect the input terminal of said first balancing circuit to the input terminal of said second balancing circuit, an impedance shunting the output terminals of said second balancing circuit, a pair of series connected, oppositely poled rectifiers shunting said impedance, the juncture between said rectifiers being connected to an intermediate point on said impedance, a fourth amplifier having an input lead connected to said intermediate point and adapted to deliver an energization current to said third solenoid.

3. Apparatus in accordance with claim 2 wherein each said balancing circuit comprises a pair of tubes having their cathodes connected to a common impedance in their respective cathode-ground circuits, whereby current increase in one tube raises the cathode potential of the other tube to effect current decrease in said other tube, and vice versa, a source of plate supply for said tubes, means biasing the grid of said other tube to a substantially constant potential with respect to ground, circuit means connecting the plates of said pair of tubes, respectively, to the output terminals of said balancing circuit, and circuit means connecting the grid of said one tube to the input terminal of the balancing circuit.

4. A follow-up system for positioning a mechanical member in accordance with an electric signal, comprising a movable member to be positioned, a pair of electric solenoid windings energizable to control movement of said member in dependence on the relative magnitudes of the energizing power applied to the respective solenoid windings, and an electric circuit for energizing said solenoid windings in accordance with an electric signal, said circuit comprising an oscillator, a rectifier and potentiometer paralleling said oscillator, an amplifier connected to the output of said oscillator, means for applying a unidirectional voltage proportional to said electric signal in series with said potentiometer to back off said rectifier and thereby to determine the amount of oscillator output to said amplifier, the slider of said potentiometer being connected to be positioned in response to the position of said member, whereby movement of said member also varies the amount of oscillator output applied to said amplifier, and means for energizing said electric solenoid windings in accordance with the output of said amplifier.

5. A follow-up system for positioning a mechanical member in accordance with an electric signal, comprising a movable member to be positioned, a pair of electric solenoid windings energizable to control movement of said member in dependence on the relative magnitudes of the energizing power applied to the respective solenoid windings, and an electric circuit for energizing said solenoid windings in accordance with an electric signal, said circuit comprising an oscillator, a rectifier and potentiometer paralleling said oscillator, an amplifier connected to the output of said oscillator, means for applying a unidirectional voltage proportional to said electric signal to said potentiometer to back off said rectifier and thereby to determine the amount of oscillator output applied to said amplifier, the slider of said potentiometer being connected to be positioned in response to the position of said member, whereby movement of said member also varies the amount of oscillator output applied to said amplifier, a pair of tubes having their grids conversely connected to the output of said amplifier whereby increased amplifier output increases the conductivity of one tube while decreasing that of the other, and vice versa, and circuit means connecting said pair of electric solenoid windings, respectively, to the plate outputs of said pair of tubes.

WAYNE B. MOORE.

References Cited in the file of this patent

UNITED STATES PATENTS

| Number | Name | Date |
|---|---|---|
| 531,532 | Hill | Dec. 25, 1894 |
| 896,129 | Kramer | Aug. 18, 1908 |
| 2,032,514 | Swart | Mar. 3, 1936 |
| 2,087,387 | Price | July 20, 1937 |
| 2,113,853 | Nicholson | Apr. 12, 1938 |
| 2,240,039 | Hickman | Apr. 29, 1941 |
| 2,262,173 | Fischer | Nov. 11, 1941 |
| 2,346,838 | Haight | Apr. 18, 1944 |
| 2,352,953 | Haight | July 4, 1944 |
| 2,372,106 | Nagel | Mar. 20, 1945 |
| 2,376,513 | Shaffer | May 22, 1945 |
| 2,390,425 | Crum | Dec. 4, 1945 |
| 2,391,017 | Grontkowski | Dec. 18, 1945 |
| 2,398,421 | Frische | Apr. 16, 1946 |
| 2,403,917 | Gille | July 16, 1946 |
| 2,410,289 | Kellogg | Oct. 29, 1946 |
| 2,423,935 | Hart | July 15, 1947 |
| 2,424,288 | Severy | July 22, 1947 |
| 2,473,038 | Rockwell | June 14, 1949 |